United States Patent [19]

Sobol

[11] Patent Number: 5,185,673
[45] Date of Patent: Feb. 9, 1993

[54] AUTOMATED IMAGE CALIBRATION

[75] Inventor: Robert E. Sobol, Fort Collins, Colo.

[73] Assignee: Hewlett-Packard Company, Palo Alto, Calif.

[21] Appl. No.: 714,392

[22] Filed: Jun. 12, 1991

[51] Int. Cl.[5] .......................... H04N 1/23; H04N 1/46
[52] U.S. Cl. ...................................... 358/296; 358/80; 358/406; 358/455; 358/463; 358/464; 395/109
[58] Field of Search ............... 358/296, 300, 298, 406, 358/447, 448, 455, 461, 463, 464, 486, 488, 80, 78; 395/109

[56] References Cited

U.S. PATENT DOCUMENTS 4,710,785 12/1987 Mills .................................... 358/300
5,107,332 4/1992 Chan .................................... 358/80

Primary Examiner—Benjamin R. Fuller
Assistant Examiner—Scott A. Rogers

[57] ABSTRACT

A document processing system (DPS) having a closed feedback loop for improving the quality of the printed form of images that have been scanned into the DPS by scanners. The DPS includes a print path. The closed feedback loop automatically calibrates the print path such that printed documents have a true representation of the scanned image. The closed feedback loop operates as follows. First, a calibration image for the print path is created. Then, the calibration image is processed in the DPS. Then, distortions in the calibration image, caused by the processing, are measured. Then, calibration coefficients for offsetting the distortions are calculated. Finally, the image of the original document is precompensated by modifying the image according to the calibration coefficients.

17 Claims, 19 Drawing Sheets

FIG 10B

RESPONSE

| INDEX | R | G | B |
|---|---|---|---|
| 0 | 2 | 4 | 1 |
| 1 | 2 | 4 | 3 |
| 2 | 6 | 7 | 0 |
| ... | | | |
| 215 | | | |

STIMULUS

| INDEX | R | G | B |
|---|---|---|---|
| 0 | 0 | 0 | 0 |
| 1 | 0 | 0 | 2 |
| 2 | 3 | 5 | 3 |
| ... | | | |
| 215 | | | |

1002 → ; 1008A, 1010A, 1012A, 1014A

| INDEX | R | G | B |
|---|---|---|---|
| 0 | 0 | 0 | 0 |
| 1 | 0 | 0 | 1 |
| 2 | 0 | 0 | 2 |
| ⋮ | | | |
| 511 | 7 | 7 | 7 |

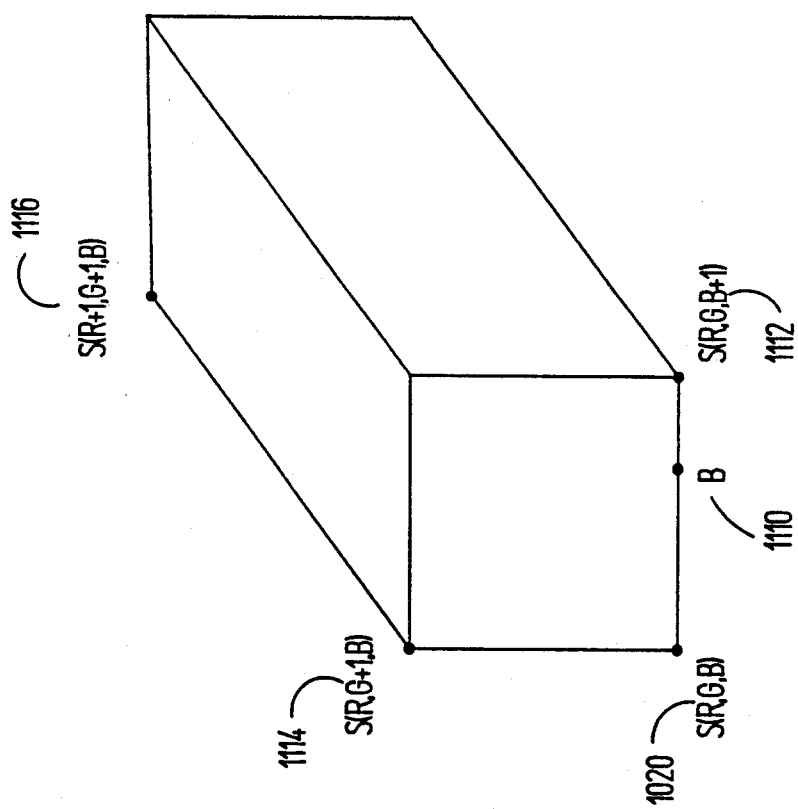

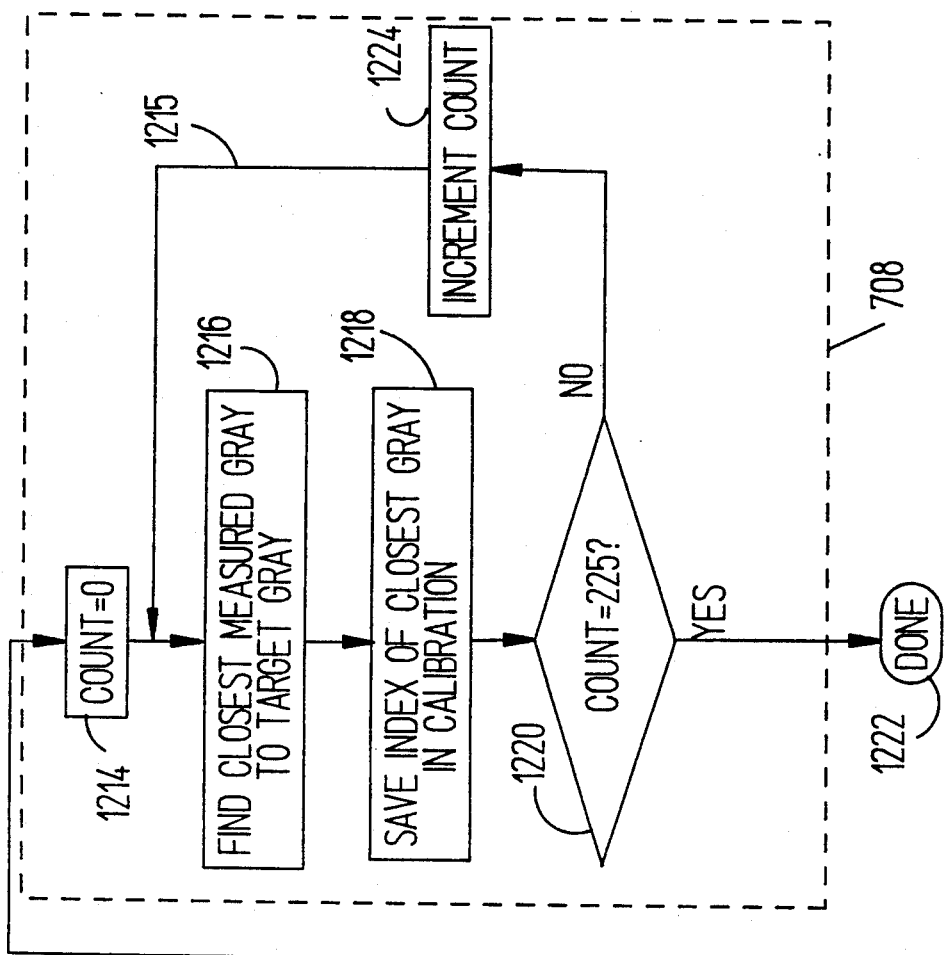
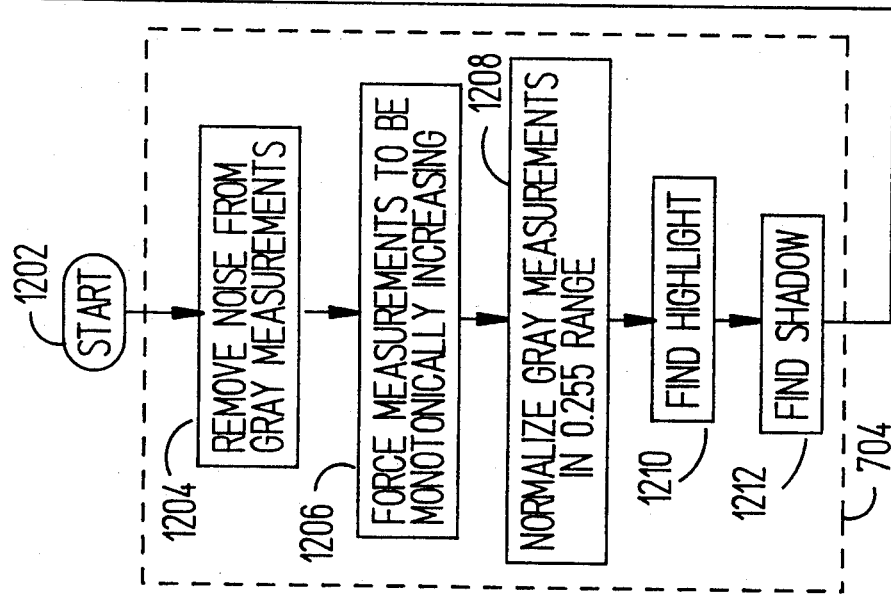
FIG 12

| INDEX | STIMULI | RESPONSE |
|---|---|---|
| 0 | 0 | 2 |
| 1 | 1 | 10 |
| 2 | 2 | 10 |
| 3 | 3 | 15 |
| . | . | . |
| . | . | . |
| . | . | . |
| . | . | 203 |
|  |  | 203 |
| 254 | 254 | 204 |
| 255 | 255 | 204 |

AUTOMATED IMAGE CALIBRATION

BACKGROUND OF THE INVENTION

1. Field of the Invention

The present invention relates generally to systems and methods for improving the printed form of images. More particularly, the present invention relates to systems and methods for automatically calibrating print paths having image capture devices, such as scanners.

2. Related Art

FIG. 1 illustrates a model of a document preparation system (DPS). The DPS has a scanner 104, or some other input capture device (ICD). The DPS also has monitors 108, a printer driver, and a printer. The monitors 108 may represent the same physical monitor.

In operation, an operator uses the scanner 104 to input an original document 102. The original document 102 may be either in color or black and white. Associated with the scanner 104 is scanner software. The scanner 104 and scanner software convert the original document 102 into a digital image. This conversion is represented by a transfer function 106A. The transfer function 106A modifies and in some cases distorts the digital image from a perfect representation of the original document 102.

The scanner software may contain routines for generating an intermediate representation of the digital image for display on the monitor 108A. This generation is represented by a transfer function 106B. The transfer function 106B may further distort the digital image.

The monitor 108A itself modifies the digital image. Such modification is required to display the digital image on the monitor 108A and is represented by a transfer function 106C. The transfer function 106C may further distort the digital image.

The digital image is subject to interpretation and modification by the software and hardware components of the DPS. Such software and hardware components include image editors, desktop publishing packages (DTP), printer drivers, printers, and copiers. These software and hardware components modify the digital image. Such modification is represented by transfer functions 106D–106K. The transfer functions 106D–106K may further distort the digital image.

The DPS produces a final document 114. Ideally, the final document 114 contains a perfect representation of the original document 102. However, because the transfer functions 106 may distort the digital image, the final document 114 often does not contain a perfect representation of the original document 102.

Therefore, problems exist when original documents 102 are scanned into a DPS to produce final documents 114, because transfer functions 106 associated with the DPS may distort the original documents 102 such that the final documents 114 do not contain a perfect representation of the original documents 102.

SUMMARY OF THE INVENTION

The present invention is directed to a document processing system (DPS) having a closed feedback loop which improves the quality of the printed form of images that have been scanned into the DPS by scanners.

The closed feedback loop of the present invention compensates for image degradations introduced by (1) software applications which read and modify the scanned image; (2) elements of a printing system, such as a software driver, controller, marking engine, paper, and media selection; (3) processes that occur after the marking engine has done its work such as making photocopies of a print and developing film from an imagesetter.

Specifically, the present invention is directed to a document processing system having a print path. The print path includes a scanner (or other image capture device) for capturing an image of an original document. The print path also includes scanner software, application programs, printer, printer driver, and a photocopier.

The document processing system of the present invention also includes a closed feedback loop for automatically calibrating the print path such that printed documents have a true representation of the scanned image. The closed feedback loop operates as follows. First, a calibration image for the print path is created. Then, the calibration image is processed in the document processing system. Then, distortions in the calibration image, caused by the processing, are measured. Then, calibration coefficients for offsetting the distortions are calculated. Finally, the image of the original document is precompensated by modifying the image according to the calibration coefficients.

FEATURES AND ADVANTAGES OF THE INVENTION

The present invention includes a number of features and advantages. First, the present invention improves the quality of scanned and printed images for continuous-tone grayscale, continuous-tone color, black and white scanner halftones, and color scanner halftones.

Second, the calibration features of the present invention require little user intervention. The user need only place a printed calibration image on a scanner bed and direct the scanner and scanner software to measure the printed calibration image. The present invention automatically locates the printed calibration image, makes all measurements, and performs all necessary calculations. Conventional solutions to the problem described above require extensive user interaction.

Third, the present invention is insensitive to placement of a printed calibration image on the scanner bed. The printed calibration image can be slightly rotated or "skewed" and correct measurements will still be made.

Fourth, distortions introduced by all elements inside a print path are reduced. Significant distortions that are reduced include:

(a) Distortions introduced by application software (such as desktop publishing applications) which interpret image files and process them in different ways. Some of these distortions arise from a lack of suitable industry-wide standards for color and grayscale images. Others arise from applications intentionally (or sometimes unintentionally) modifying or unintentionally misinterpreting the intended meaning of the image data.

(b) Distortions introduced by the type of printing mechanism, its formatter, and software driver.

(c) Distortions introduced by unit-to-unit variations from one printer to another, such as lighter or darker tone cartridges in laser printers.

(d) Distortions introduced by using different types of paper or media in a printer, including lightly colored or textured papers.

(e) Distortions introduced by using a photocopier to reproduce the printed image.

(f) Distortions introduced by phototypesetters due to differences in paper brand, type, exposure and development.

(g) Distortions introduced by individual paper, ink and press conditions when reproducing images on commercial printing presses.

Fifth, some software applications contain fixed calibrations for a limited number of supported printers. The user must get a software update from the product vendor to get support for new printers. This invention allows the user to calibrate any printer, even ones that were not available when the present invention was purchased by the user.

Sixth, many of the distortions in the print path are time-varying. Conventional products that depend on fixed calibrations have no way of adapting their compensation for drift over time. The present invention permits the user to compensate for these time-varying problems.

Seventh, prior solutions to the problem described above (for example, Agfa Focus scanner software and Astral Picture Publisher) measure a limited number of gray levels. The present invention measures all the gray levels supported by the scanning and printing devices. With this comes a greater precision and control in the compensation, particularly in the important gray values near solid black (where there is a huge visual difference between gray levels) and near solid white (where the lightest printable gray on the printer is visually much darker than the paper.)

Eighth, the present invention modifies the dotgain compensation of scanner halftones as dotgain varies in the print path. In conventional solutions to the problem described above, scanner halftones have fixed dotgain compensation values. Thus, there is no way to adjust dotgain compensation to better match the properties of the actual printer being used.

Ninth, the present invention automatically makes all measurements for the user. When scanning printed calibration images the present invention knows from information encoded in the calibration images how many printed calibration images are required. Currently there are two calibration images for a color printer (one grayscale and one color.) After scanning the first printed calibration image, the present invention automatically prompts the operator for the other printed calibration image.

Tenth, sometimes an application will print an image saved in one file format differently from the same image saved in a different file format. The present invention keeps track of the file format that was used for the calibration images by encoding them in the calibration images, and in the calibrations that are created from those calibration images.

Eleventh, the present invention modifies the amount of dotgain compensation applied to scanner halftones as the user changes the resolution of the scan. The native printer resolution is encoded in the calibration image. If the user scans at a resolution other than that of the native printer resolution then the dotgain compensation is adjusted accordingly; it is coordinated with compensation for the dotgain of the printer.

Twelfth, the area immediately surrounding the color or gray patches contains a 50% gray and a full black band. These help minimize optical flare in the scanner from affecting measurements of grays and colors at the perimeter of the calibration image.

Thirteenth, many computer printers produce horizontal streaks across the page. The grayscale and black bands on each side of the calibration image reduce the measurement noise caused by these streaks.

Further features and advantages of the present invention, as well as the structure and operation of various embodiments of the present invention, are described in detail below with reference to the accompanying drawings, and in the claims. In the drawings, like reference numbers indicate identical or functionally similar elements.

BRIEF DESCRIPTION OF THE DRAWINGS

The present invention will be described with reference to the accompanying drawings, wherein:

FIGS. 10A and 10B collectively illustrate a first lookup table.

FIG. 10C illustrates indices of a color compensation table and corresponding desired responses.

FIG. 11B illustrates a stimulus and adjacent stimulus.

FIG. 12 illustrates the creation of grayscale coefficients.

FIG. 14 illustrates a second lookup table.

DETAILED DESCRIPTION OF THE PREFERRED EMBODIMENTS

1. Overview of the Present Invention

Figure 2:
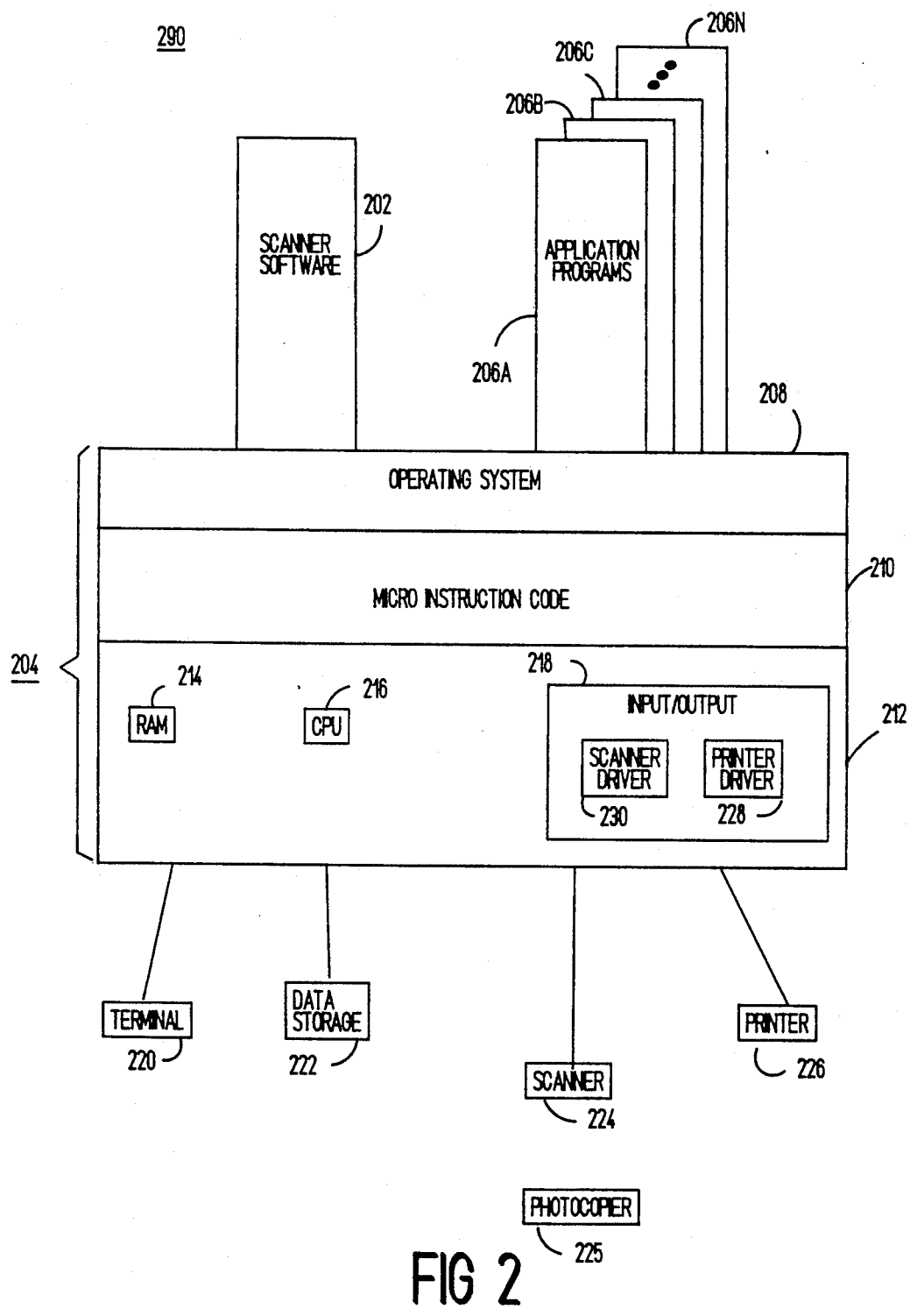
FIG. 2 illustrates a block diagram of the present invention.

FIG. 2 illustrates a block diagram of the present invention. The present invention is a document processing system 290 which includes a computer platform 204. The computer platform 204 includes hardware components 212, such as a random access memory (RAM) 214, a central processing unit (CPU) 216, and an input/output (I/O) interface 218.

The computer platform 204 also includes an operating system 208, and may include microinstruction code 210.

The document processing system 290 of the present invention also includes peripheral devices which are connected to the computer platform 204. These peripheral devices include a terminal 220, a data storage device 222, a scanner 224 (or some other input capture device), and a printer 226. The I/O interface 218 (or alternatively the operating system 208) includes a scanner driver 230 and a printer driver 228 for operation with the scanner 224 and the printer 226, respectively.

In a preferred embodiment of the present invention, the computer platform 204 is an International Business Machines (IBM) compatible personal computer. In a first alternate embodiment of the present invention, the computer platform 204 is an Apple Macintosh personal computer. In a second alternate embodiment of the present invention, the computer platform 204 is an Unix-based computer system.

In the preferred embodiment of the present invention, the scanner 224 is either an Hewlett-Packard (HP) ScanJet Plus scanner or an HP ScanJet IIC scanner. The printer 226 is an HP PaintJet printer.

According to the present invention, various application programs 202, 206 operate on the computer platform 204. Depending on the operating system 208, the application programs 202, 206 may either operate sequentially or in parallel.

The application programs 202, 206 include computer programs for processing documents, such as an image editor and a desktop publishing package.

According to the present invention, the application programs 202, 206 also include scanner software 202. The scanner software 202 controls the scanner 224. The general structure and operation of the scanner software 202 is well known in the art. Specific structural and operational features of the scanner software 202 which are novel, unobvious, and necessary to achieve the features and advantages of the present invention are described in detail in the following sections. The scanner software 202 is written in a C programming language and an assembly programming language.

The document processing system 290 also includes a photocopier 225.

Figure 3:
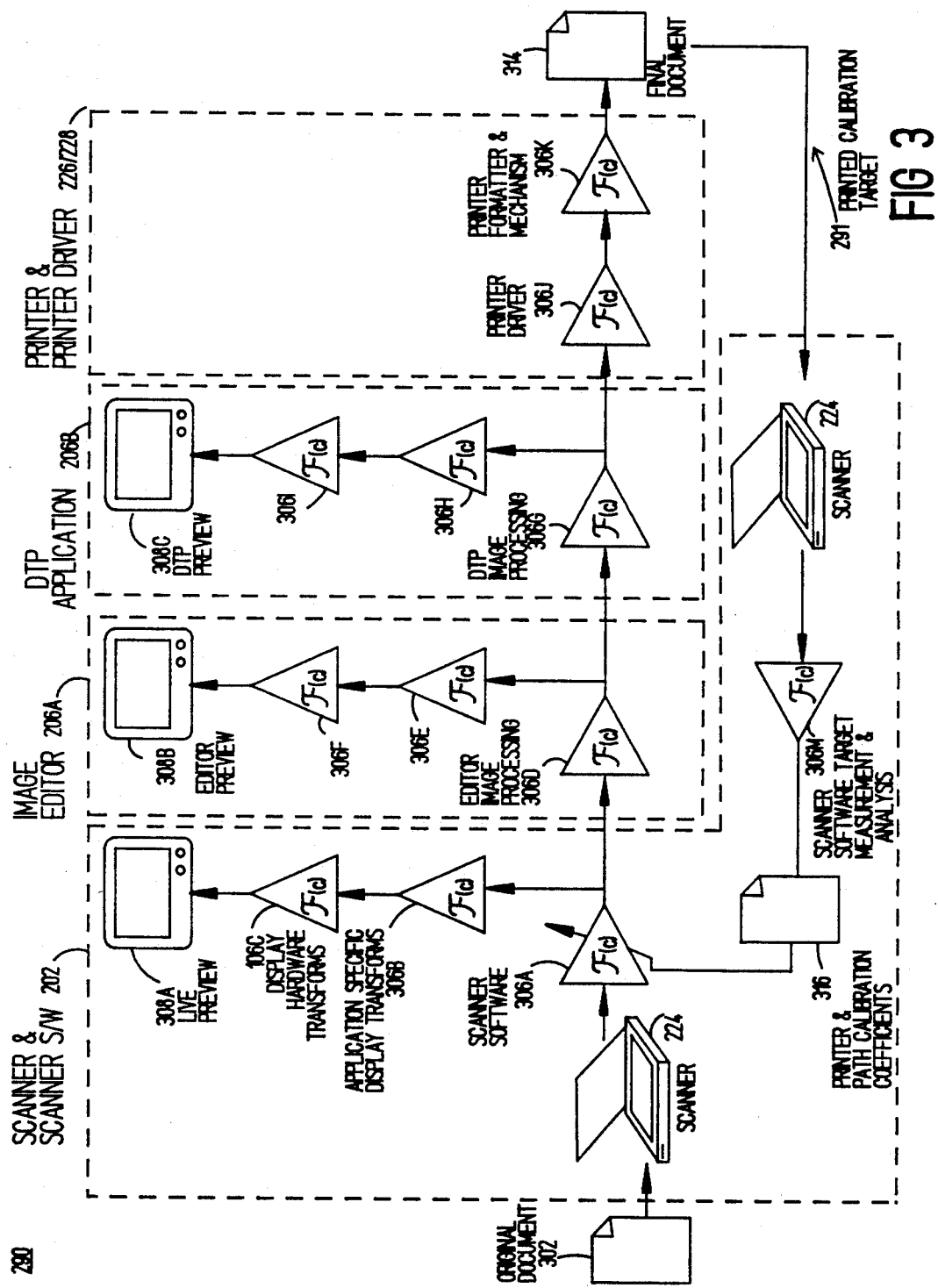
FIG. 3 illustrates a document processing system 290 having a closed feedback loop 291 of the present invention.

According to the present invention, the document processing system 290 includes a closed feedback loop 291 which improves the quality of the printed form of documents 302 which have been scanned using the scanner 224. FIG. 3 illustrates the document processing system 290 having the closed feedback loop 291 of the present invention.

Figure 1:
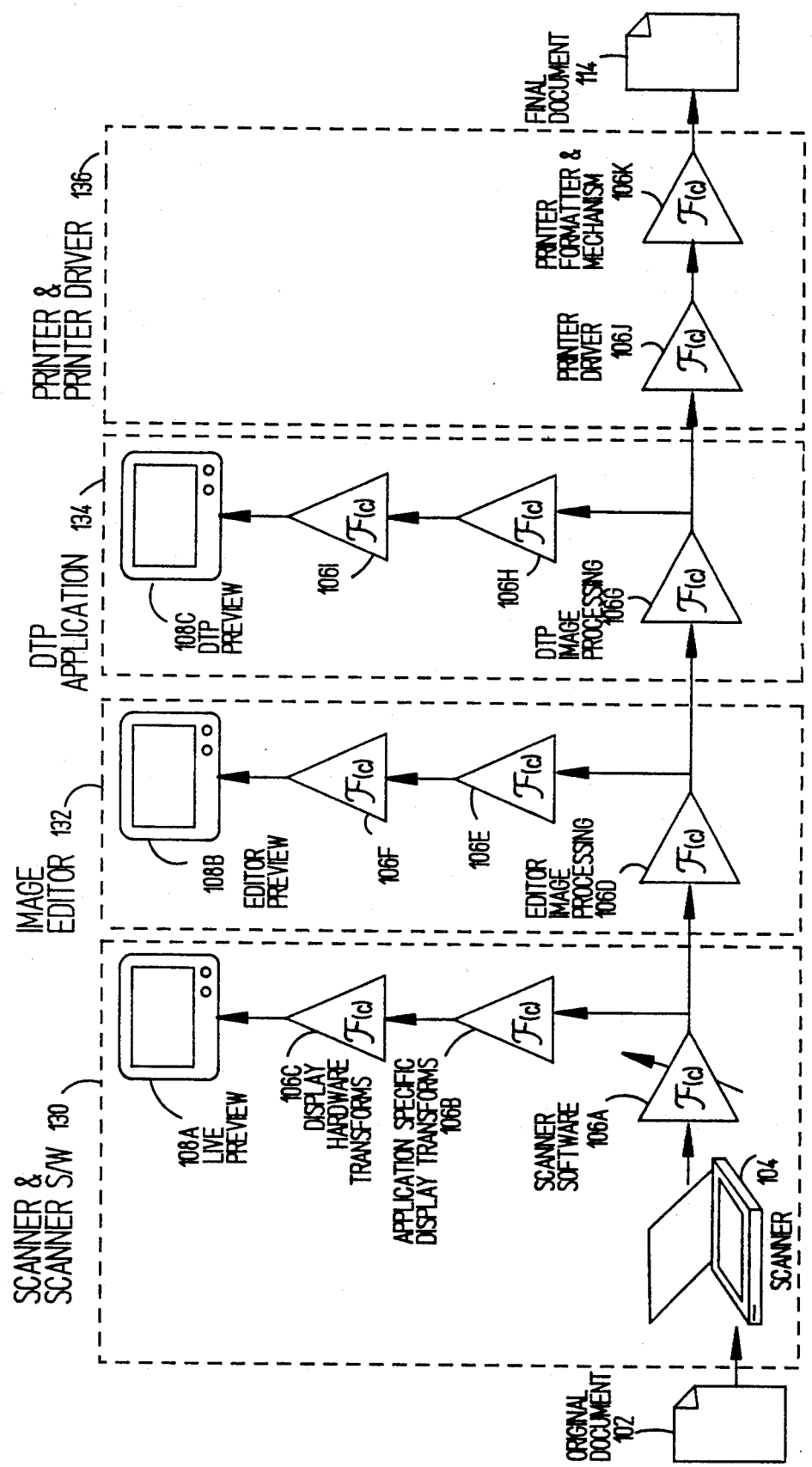
FIG. 1 illustrates a model of a document preparation system (DPS).

FIG. 3 is similar to FIG. 1 in that an operator uses the scanner 224 to input an original document 302. The scanner 224 and scanner software 202 produce a digital image of the original document 302. In the conventional document processing system in FIG. 1, the final document 114 does not contain a true representation of the original document 102 because the transfer functions 106 distort the digital image of the original document 102.

The document processing system 290 of the present invention also contains transfer functions 306 which distort the digital image. However, due to the operation of the closed feedback loop 291, the scanner software 202 of the present invention compensates for the distortions caused by the transfer functions 306. Therefore, in the document processing system 290 of the present invention, the final document 314 does contain a true representation of the original document 302.

In this patent document, the transfer functions 306 which distort the digital image of the original document 302 are collectively called a print path. Note that the photocopier 225 may be in the print path. Also note that the elements shown in FIG. 3 may not always be present. For example, the photocopier 225 may not always be used. The print paths associated with the document processing system 290 when the photocopier 225 is used and when the photocopier 225 is not used are different.

The document processing system 290 of the present invention operates generally as follows. First, the print path is calibrated. The print path is calibrated by (1) measuring the distortions caused by the transfer functions 306 contained in the print path; and (2) calculating calibration coefficients 316 for compensating the distortions.

Second, the calibration coefficients 316 are used to modify the digital image of an original document 302. The digital image is then said to be precompensated. The calibration coefficients 316 effectively modify the transfer function 306A associated with the scanner software 202. The distortions caused by the transfer functions 306 are offset by the modifications caused by the calibration coefficients 316, such that the final document 314 contains a true representation of the original document 302.

Note that each particular print path requires separate calibration.

Figure 4:
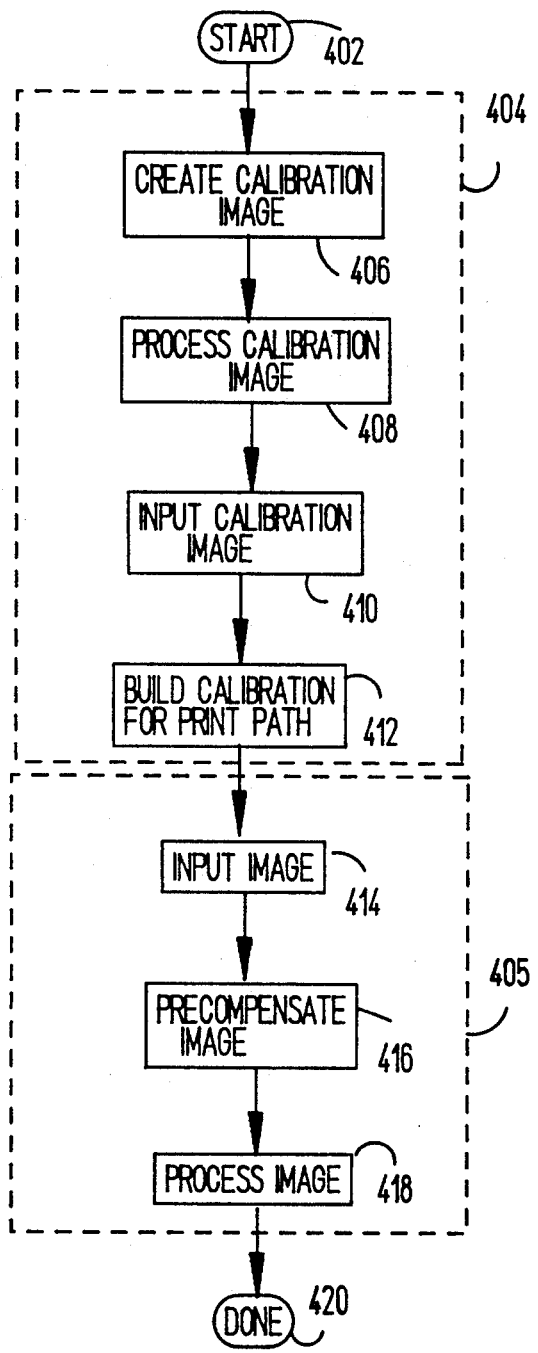
FIG. 4 illustrates the operation of the document processing system 290 having the closed feedback loop 291.

FIG. 4 illustrates the operation of the document processing system 290 having the closed feedback loop 291 in greater detail. The steps in box 404 relates to calibrating a print path. The steps in box 405 relates to precompensating an original document 302.

In step 406, a calibration image is created. The calibration image is used to calibrate the print path.

To calibrate the print path, an user instructs the scanner software 202 to create one or more synthetic digital images. These synthetic digital images are called calibration images. The calibration images are written to files in the same fashion as normal scanned images (and in the same file format, such as TIFF, PICT, and PCX), or can be sent directly to a computer printer 226 to calibrate the current print path. Each calibration image contains:

(a) Information about the calibration being performed, including native printer resolution, file format (such as TIFF, EPSF, PICT, and PCX), whether the calibration is for a color or black and white printer, whether the target contains grayscale patches or color patches, and version number of the scanner software 202. This information is then used by the scanner software 202 when rescanning the calibration image and is binary-coded in the calibration image.

(b) For color calibration, a collection of colors (216 colors in the preferred embodiment of the present invention). These colors are scanned and used by the scanner software 202 to measure the color response of the print path.

(c) For black and white calibration, a collection of grays (256 grays in the preferred embodiment of the present invention). These grays are used by the scanner software 202 to measure the grayscale response of the print path.

(d) For both color and black and white calibration, a collection of patterns (such as checkerboards). These patterns are used by the scanner software 202 to measure the response of the print path for images in which the scanner 224 or scanner software 202 did a halftone conversion from continuous-tone to binary (B&W only or 8 colors). In an alternate embodiment, multiple calibration images having multiple halftone samples for the calibration of a single print path may be created by the scanner software 202.

(e) Image elements to better enable the scanner software 202 to find and measure details on the calibration image regardless of placement of the calibration image (in printed form).

In step 408, the operator uses the document processing system 290 to process the calibration image(s) (one for black and white and two for color printers). The operator processes the calibration image(s) in the same manner that the operator would process original documents 302 such that the distortions caused by the transfer functions 306 in the calibration image(s) are the same as would be in the original documents. For example, suppose the operator intends to create a final document 314 using Aldus PageMaker, print it on an HP PaintJet printer, then make color photocopies for distribution. For this scenario, the operator would load the calibration image(s) into PageMaker, then print them on the HP PaintJet, then make color photocopies.

In step 410, the operator uses the scanner 224 to scan in the printed calibration image(s).

In step 412, the scanner software 202 measures the distortions in the calibration image(s) caused by the transfer functions 306 in the print path being calibrated. The scanner software 202 calculates calibration coefficients 316 for compensating the distortions. Following step 412, the calibration of the print path is complete. The calibration of the print path may be stored and then retrieved whenever this particular print path is used by the operator.

Suppose the operator wishes to create a final document 314 using the print path that was just calibrated in steps 406–412.

In step 414, the operator scans in an original document 302.

In step 416, the scanner software 202 uses the calibration coefficients 316 associated with the calibration of the print path in order to precompensate the digital image associated with the original document 302.

In step 418, the operator uses the document processing system 290 to process the digital image associated with the original document 302. The transfer functions 306 in the print path distorts the digital image. However, because the digital image has been precompensated by the scanner software 202, the distortions caused by the transfer functions 306 are offset such that the final document 314 contains a true representation of the original document 302.

Steps 406, 410, 412, and 416 are described in greater detail in the following sections.

2. Operation of the Present Invention

The following sections describe the operation of the present invention in greater detail.

2.1. Create Calibration Image

As noted above, calibration images are used to calibrate a print path.

The preferred embodiment of the present invention includes a color calibration image (CCI) and a grayscale calibration image (GCI). To calibrate a print path having a color printer, both the CCI and GCI are used. To calibrate a print path having a black and white printer, only the GCI is used.

The structure and operation of the color and grayscale calibration images are described in this section. The operation of the color and grayscale calibration images with respect to the operation of the present invention as shown in FIG. 4 is further described in other sections of this patent document.

Figure 5:
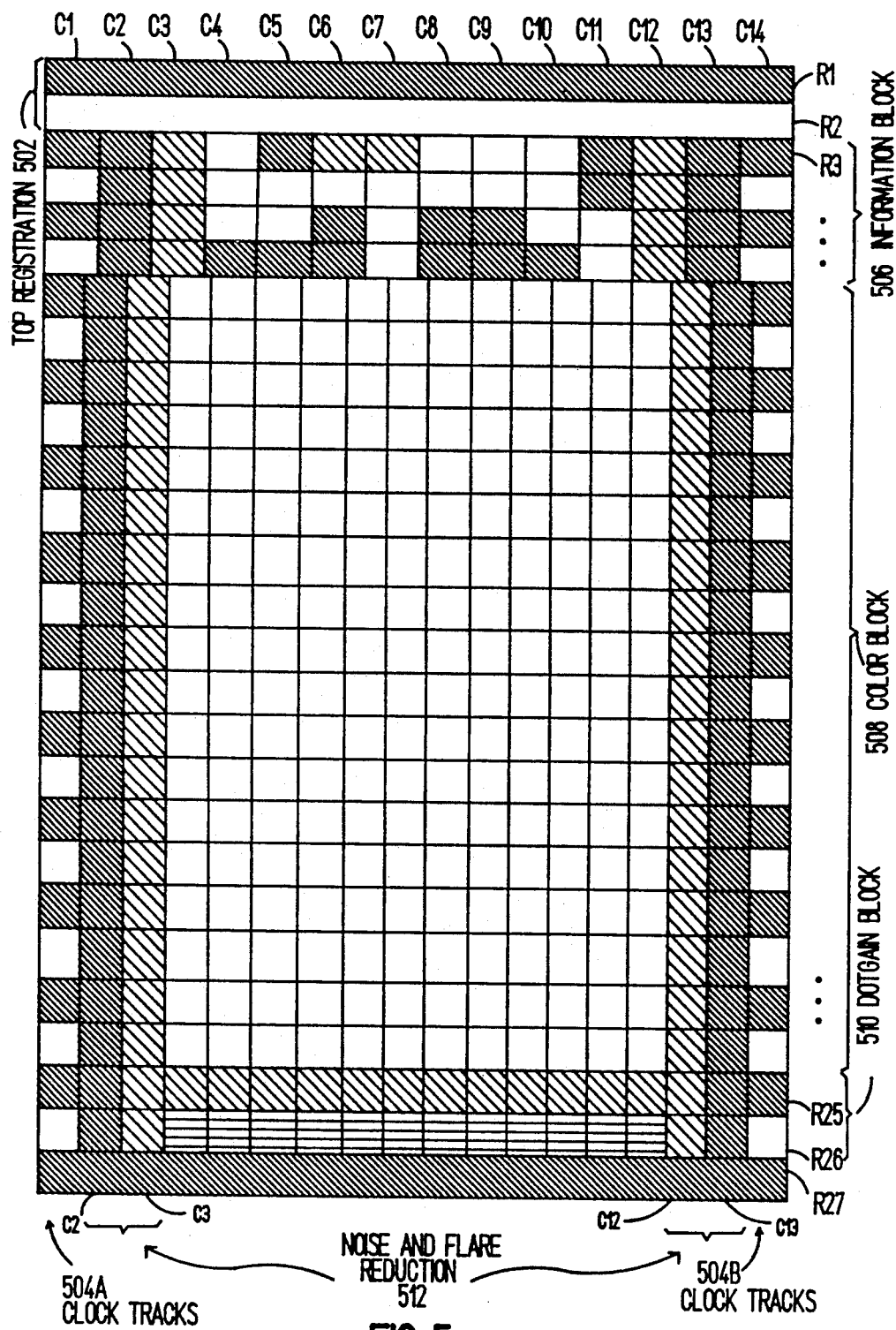
FIG. 5 illustrates a color calibration image.
Figure 6:
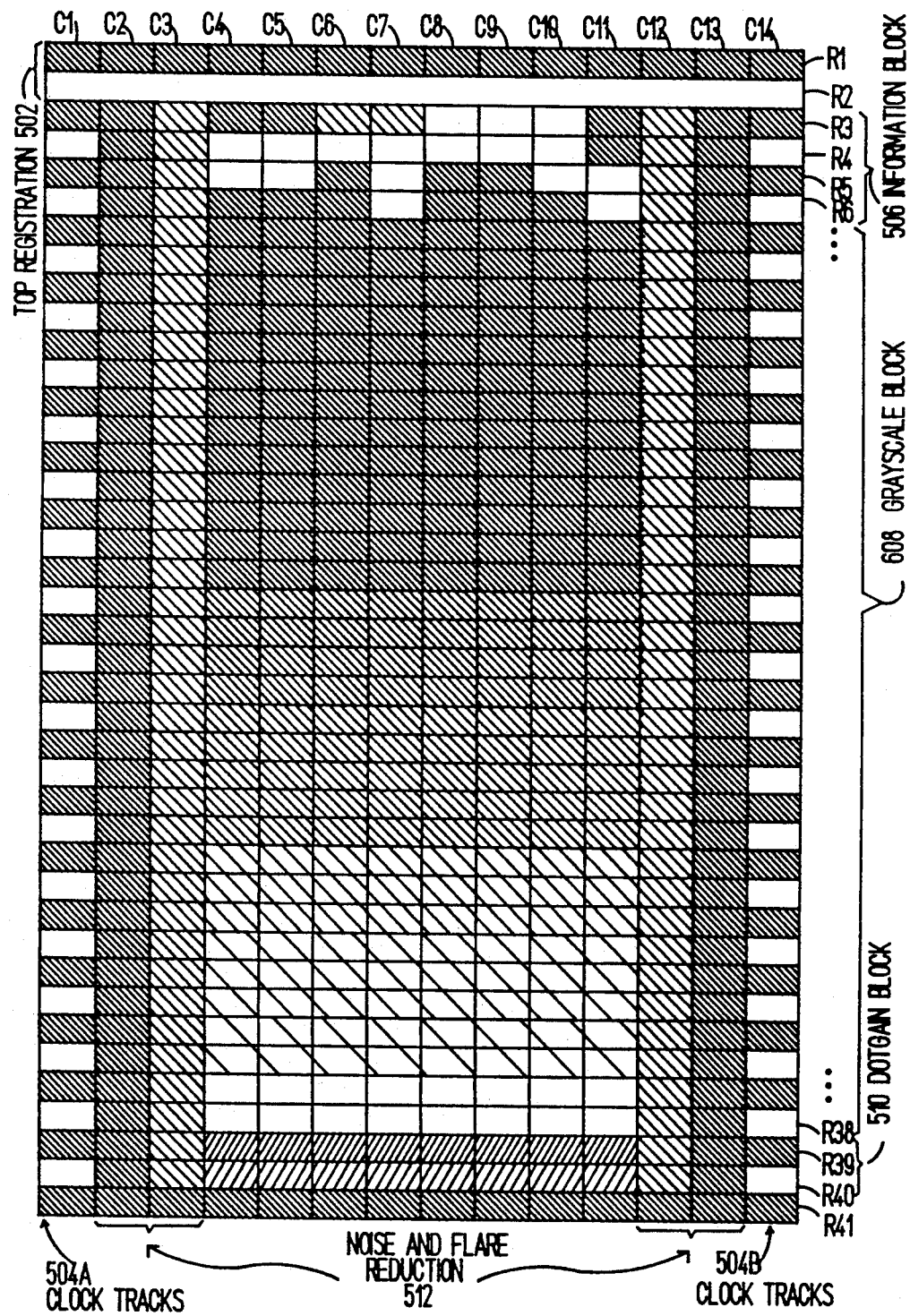
FIG. 6 illustrates a grayscale calibration image.

FIGS. 5 and 6 illustrate the color and grayscale calibration images, respectively, according to the preferred embodiment of the present invention. The structure and operation of the color and grayscale calibration images are similar. Therefore, only the color calibration image is described below. However, the following discussion identifies and describes the specific differences between the color and grayscale calibration images.

The CCI includes 27 rows (labeled R1 through R27) wherein rows R1–R6 and R25–R27 each has 14 columns (labeled C1 through C14). The GCI includes 41 rows (labeled R1 through R41) wherein each row has 14 columns (labeled C1 through C14).

The CCI includes a top registration 502 which has a black row and a white row. The scanner software 202 uses the top registration 502 to locate the position of the CCI when the CCI (in printed form) is placed on a scanner bed for scanning by the scanner 224 (locating the position of the CCI involves determining the CCI's vertical position, lateral position, width and rotation or skew). Thus, the scanner software 202 properly operates, even though an operator may not have perfectly aligned the CCI on the scanner bed. Therefore, the top registration 502 facilitates the operation of the scanner software 202. The manner in which the scanner software 202 uses the top registration 502 to locate the position of the CCI is described in another section of this patent document.

The CCI also includes clock tracks 504. The scanner software 202 uses the clock tracks 504 to properly scan down the CCI once the position of the CCI has been located (by using the top registration 502).

The CCI also includes an information block 506. The information block 506 includes the area bounded by rows R3, R6 and columns C4, C11. The information block 506 includes encoded information regarding the calibration being performed. Specifically, square R3/C4 (that is, the square indicated by row R3 and column C4) identifies whether the subject calibration image is color or grayscale. White indicates color and black indicates grayscale. Since the calibration image shown in FIG. 5 is a CCI, the square R3/C4 is white.

Square R3/C5 identifies whether the subject calibration image is associated with another calibration image. Black indicates that the subject calibration image is associated with another calibration image. White indicates that the subject calibration image is not associated with another calibration image. According to the preferred embodiment of the present invention, a calibration associated with a color printer 226 includes a CCI and a GCI since color printers may print both color and black and white documents. A calibration associated with a black and white printer 226 includes only a GCI since black and white printers may only print black and white documents. Since the calibration image shown in FIG. 5 is a CCI, the square R3/C5 is black.

Squares R3/C6–C7 are unused.

Squares R3/C8–C11 represent four bits which identify a file format. When an operator requests that the scanner software 202 create a calibration image (such as that shown in FIG. 5), the operator inputs the file format in which the operator wishes the calibration image to be saved. The four bits of squares R3/C8–C11 identify the file format which was used to save the calibration image. The squares R3/C8–C11 may indicate one of sixteen file formats. The scanner software 202 of the present invention supports file formats TIFF, PICT, and PCX, which are well known in the art. The squares R3/C8–C11 identifies the TIFF file format.

Squares R4/C4–C11 and R5/C4–C11 represent 16 bits which identify the resolution of the printer 226 for which the CCI was created. The squares R4/C4–C11 and R5/C4–C11 may identify a resolution of up to 32,767 dots per inch (DPI). The squares R4/C4–C11 and R5/C4–C11 in the CCI in FIG. 5 identify a resolution of 300 DPI.

Squares R6/C4–C11 represent 8 bits which identify a version of the scanner software 202.

Note that the operator need enter the information in the information block 506 only once since the information is stored in the information block 506. Thus, the information block 506 facilitates the operation of the scanner software 202.

The CCI also includes a color block 508 (bounded by rows R7, R24 and inside the noise and flare reduction blocks 512). The color block 508 contains 216 squares (18 rows by 12 columns) wherein each square contains a different color. Thus, in the preferred embodiment of the present invention, the color block 508 contains 216 different colors. The colors in the color block 508 are used by the scanner software 202 to measure the color response of the print path for color documents 302. The colors in the color block 508 may be any colors which sufficiently exercise the color range of the printer 226. The color block 508 contains saturated blues, saturated reds, and saturated greens. The color block 508 also contains combinations of these colors.

Unlike the CCI in FIG. 5, the GCI in FIG. 6 includes a grayscale block 608 (bounded by rows R7, R38 and columns C4, C11) which contains 256 squares, wherein each square contains a different shade of gray. Thus, the grayscale block 608 contains 256 shades of gray (32 rows by 8 columns). The grayscale block 608 is used by the scanner software 202 to measure the grayscale response of the print path for black and white documents 302 and color/black and white documents 302.

The CCI also includes a dotgain block 510 which is bounded by rows R25, R26 and columns C4, C11 (in the GCI, the dotgain block 510 is bounded by rows R39, R40 and columns C4, C11). The top row in the dotgain block 510 includes a first half tone pattern which has, according to the preferred embodiment of the present invention, a pattern made of 2 pixels wide by 2 pixels high black followed by 2 pixels wide by 2 pixels high white. The bottom row in the dotgain block 510 includes a second half tone pattern which has, according to the preferred embodiment of the present invention, a pattern made of 4 pixels wide by 4 pixels high black followed by 4 pixels wide by 4 pixels high white. The dotgain block 510 is used by the scanner software 202 to perform dotgain compensation wherein the scanner software 202 measures the response of the print path for continuous-tone images which the scanner 224 or the scanner software 202 converted to halftone.

In an alternate embodiment, multiple calibration images having multiple halftone samples for the calibration of a single print path may be created by the scanner software 202.

The CCI also includes noise and flare reduction blocks 512 (columns C2, C3, C12, C13 between rows R3–R27) for reducing noise and flare (in the GCI, the noise and flare reduction blocks 512 are columns C2, C3, C12, C13 between rows R3–R40). Such noise and flare is well known in the art. By reducing noise and flare, the scanner 224 may more accurately scan in the printed CCI.

2.2. Input Calibration Image

As described above, in step 410, the operator uses the scanner 224 to scan in the printed calibration image(s). This section describes step 410 in greater detail.

2.2.1. Operation

The scanner software 202 of the present invention controls the scanner 224 such that the scanner 224 scans a printed calibration image as follows.

First, the scanner 224 (and scanner software 202) starts in an area of known reflectance (paper white) and measures that reflectance. This gives a calibration or reference value since paper varies in average reflectance (usually from about 60% up to 85%).

Then, the scanner 224 uses the top registration 502 of the calibration image to locate the position of the calibration image. Specifically, the scanner 224 scans down each raster scan line until the scanner 224 finds a series of black. The scanner 224 assumes that the series of black represents the black line of the top registration 502. The first occurrence of the series of black denotes the vertical position of the calibration image. The scanner 224 keeps track of the right and left edges of the black line of the top registration 502 in order to determine the lateral position of the calibration image, the width of the calibration image, and to determine whether the calibration image is skewed on the scanner bed.

The scanner 224 continues scanning down each raster scan line until one of the edges turns white. The scanner 224 assumes that the white marks the beginning of the white line of the top registration 502. By knowing which edge turned white first, the scanner 224 can determine the direction in which the calibration image is skewed (that is, either clockwise or counter-clockwise). If both edges turn white at the same time, the scanner 224 knows that the calibration image is not skewed.

Once the scanner 224 finds an edge which turned white, the scanner 224 continues scanning each raster scan line until the other edge turns white. By knowing the distance from where the first edge turned white to where the second edge turned white, the scanner can determine the degree to which the calibration image is skewed.

After both edges have turned white, the scanner 224 searches for data (starting with the information block 506). The scanner 224 searches for data by searching in the clock tracks 504 for the occurrence of black. The first black in the clock tracks 504 after the white in the top registration 502 marks the beginning of the information block 506. If the scanner 224 has previously found that the calibration image is skewed in a clockwise direction, then the scanner 224 looks for black in the clock tracks 504 at the left edge. If the scanner 224 has previously found that the calibration image is skewed in a counter-clockwise direction, then the scanner 224 looks for black in the clock tracks 504 at the right edge.

Once the scanner 224 finds the data, the scanner 224 scans in the data (that is, information block 506, color 508 or grayscale block 608, and dotgain block 510) using the clock tracks 504 to mark the boundaries between the rows of the data and using the measured skew.

As noted above, in the preferred embodiment of the present invention, the scanner 224 is an HP ScanJet IIC scanner. To scan in a calibration image, the HP ScanJet IIC scanner should use its default tonemap, which scans 1 ... 100% reflectance range. This prevents the tonemap hardware in the scanner 224 from changing any of the digital data. In essence, this turns the scanner 224 into a reflectance densitometer in which a digital value of 225 represents 1% reflectance and a value of 0 represents 100% reflectance. There is some variation in the 1% readings due to dark current, optical flare in the scanner 224, thermal variation in the lamp, and offset in the analog circuitry.

Calibration scans are performed at 200 dots per inch to achieve good speed, although they could be performed at different resolutions.

2.2.2. Noise Reduction

The printers 226 may introduce noise into the calibration images such that the scanner 224 cannot accurately scan in the calibration images. For example, laser printers, like the Canon SX engine used in the LaserJet II and LaserWriter NTX, tend to introduce light streaks horizontally across the page. These streaks tend to equally affect all areas that have toner—solid black and halftone alike. Inkjet printers, like the HP DeskJet/DeskWriter, also show horizontal straks as the printhead scans across the page and occasionally prints on top of the previous scans' worth of image. However, inkjet streaks appear only in halftones. Solid blacks appear solid black because there is so much wet ink hitting the page that capillary action causes the ink to wick into a smooth, solid black. Laser printers also have "memory"—that is, the toner drum remembers to some degree what was printed during the last rotation. Many drums are about 3 inches in circumference, and thus "ghosts" appear with about this period. Additionally, the toner has an extreme affinity for creating streaks vertically; some portions of the page are abnormally light.

The scanner software 202 in combination with the design of the calibration images (specifically the noise and flare reduction blocks 512) compensate for horizontal streaks caused by the printer 226. During a calibration scan, the scanner software 202 averages the gray stripes contained in the noise and flare reduction blocks 512 and calculates an effective percentage screen from the following formula:

$$\% \text{ screen} = \frac{\text{grayValue} - \text{paperWhite}}{\text{inkBlack} - \text{paperWhite}}$$

where grayValue is the average digital reading from the gray stripe, paperWhite is the digital reading of the paper, and inkBlack is the darkest reading in the scan of the calibration image.

The amount that average value of a gray level deviates from its true value due to horizontal streaks (or noise) can be estimated by assuming that the amount of ink out of the printhead (or off the toner drum) is varying and that areas that are a 50% effective screen vary only half as much as those areas which are solid ink (or toner). The scanner software 202 normalizes its estimate of noise by dividing the local measurement of the gray stripe by the average % screen to give the amount of noise that should exit in a 100% ink area:

$$\text{grayNoise} = \frac{\text{grayValue} - \text{paperWhite}}{\% \text{ screen}(\text{inkBlack} - \text{paperWhite})}$$

For each gray level, the scanner software 202 observes the effective percent screen that the printer 226 produced, and compensates for the estimate of grayNoise from the previous equation:

$$\text{grayLevel} \% \text{ Screen} = \frac{\text{grayValue} - \text{paperWhite}}{\text{grayNoise}(\text{inkBlack} - \text{paperWhite})}$$

From this the scanner software 202 calculates what a noiseless gray level of this percent screen would look like:

noiselessGray = paperWhite + grayLevel % Screen(inkBlack − paperWhite)

This works well when we have a halftone that is noisy. But when we are fading towards full black the scanner software 202 takes into conisderation the different behavior on ink jet printers of the solid black areas. The scanner software 202 does exactly the same calculation on measurements of the black left and right borders, substituting, 100% for the % screen. The scanner software 202 uses the black reference for only the darkest gray values (from 192 to 255) and linearly interpolates between what the noiselessGray calculation gives and what the noiselessBlack would be.

2.3. Build Calibration for Print Path

As described above, in step 412 the scanner software 202 measures the distortions in the calibration image(s) caused by the transfer functions 306 in the print path being calibrated. The scanner software 202 calculates calibration coefficients 316 for compensating the distortions. The manner in which the scanner software 202 performs step 412 is different for black and white and for color. The procedures for black and white and for color are described below. For both black and white and color, the scanner software 202 also performs dot gain compensation if a continuous tone image has been converted to a half tone image. Dot gain compensation is also described below.

2.3.1. Black and White

Figure 7:
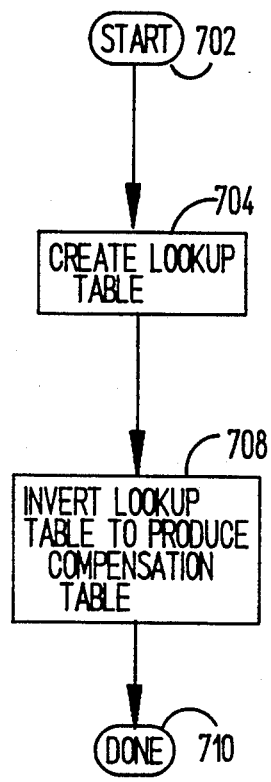
FIG. 7 illustrates the manner in which a scanner software 202 measures distortions in printed calibration images and calculates calibration coefficients 316.

FIG. 7 illustrates the manner in which the scanner software 202 measures the distortions in the grayscale calibration image(s) and calculates the grayscale calibration coefficients 316.

In step 704, the scanner software 202 builds a lookup table having 256 entries. The 256 entries correspond to the 256 levels of gray in the GCI. Each entry in the lookup table identifies what reflectance will be actually printed for the entry's corresponding level of gray in the original GCI.

For example, suppose the square C4/R30 in the original GCI has a reflectance of X. Also suppose that, due to distortions caused by the transfer functions 306 in the print path, the reflectance X in the GCI is printed as a reflectance X++. During step 704, the scanner software 202 measures the reflectance in the corresponding square C4/R30 in the printed GCI. According to the current example, the scanner software 202 would find that square C4/R30 in the printed GCI has a reflectance of X++. Thus, the scanner software 202 would insert X++ in the entry of the lookup table which corresponds to the square C4/R30.

FIG. 14 illustrates an example of the lookup table. The lookup table has indices 1402 with values from 0 to 255. The indices correspond to the 256 levels of gray in the GCI. The lookup table also has a column 1404 which contains the level of gray values from the original GCI (also called stimuli). The lookup table also has a column 1406 which contains the printed levels of gray (also called responses).

In step 708, the scanner software 202 inverts the 256 values in the lookup table. The 256 inverted values are placed in a grayscale compensation table. The grayscale compensation table represents the grayscale calibration coefficients 316 for the print path. The inverted values in the grayscale compensation table represent the pre-compensated gray values which are written into a digital image of an original document 302 for each gray value present in the original document 302. The inverted values in the grayscale compensation table offset the distortions caused by the transfer functions 306 in the print path being calibrated.

Steps 704 and 708 are described in greater detail below with reference to FIG. 12. Those respective steps associated with steps 704 and 708 are marked in FIG. 12 by dotted lines.

In step 1204 the scanner software 202 removes noise from the printed GCI. The manner in which noise is removed is discussed above.

In step 1206, the scanner software 202 determines whether the data read from the printed GCI is monotonically increasing. The data may not be monotonically increasing due to noise. Data which is not monotonically increasing is difficult to process. Therefore, in step 1206 the scanner software 202 force the data to be monotonically increasing.

A printer's 226 dynamic range may be many times narrower than a scanner's dynamic range. Thus, in step 1208, the scanner software 202 normalizes the data read from the printed GCI in order to allow for the compression of a scanned image to go into the dynamic range of the printer 226.

In step 1210, the scanner software 202 finds the smallest screen that the printer 226 can print. In other words, the scanner software 202 determines the gray value of the smallest dot which the printer 226 can lay down.

In step 1212, the scanner software 202 finds the shadow. Step 1212 is the inverse of step 1210.

In step 1214, the scanner software 202 initializes a counter, which is used to determine how many times the scanner software 202 performs the loop formed by line 1215. The loop formed by line 1215 is performed once for each entry in the lookup table (that is, 256 times). The counter is used as an index into the lookup table.

In step 1216, for the gray level in column 1404 corresponding to the counter, the scanner software 202 finds the closest value in the column 1406. For example, suppose the counter equals 2 such that the gray value in column 1404 is 2. The closest value in the column 1406 is 2 which corresponds to an index of 0.

Note that the scanner software 202 performs step 1216 in order to find a stimulus which will produce a desired response. For example, suppose an original document 302 contains a gray level having a value of 2. Using the lookup table in FIG. 14, in order to have the value of 2 from the original document 302 appear as a value of 2 in the final document 314, the scanner software 202 must replace the value of 2 in the original document with a value of 0.

In step 1218, the scanner software 202 saves the index corresponding to the closest value in the column 1406 (which was found in step 1216) in the grayscale compensation table. Thus, according to the lookup table in FIG. 14, the index 0 (determined in step 1216) will be saved in the grayscale compensation table entry at index 2 (which corresponds to a desired gray level value of 2).

In steps 1220 and 1224, the scanner software 202 performs the loop formed by line 1215 for each of the entries in the lookup table.

Referring again to step 1216, note that all gray levels in the original GCI may not have exact matches in the printed GCI (in other words, all the values in column 1404 may not have matches in column 1406). For these cases, well-known linear interpolation methods are used to determine stimuli for the gray levels in column 1404 which do not have exact matches in column 1406.

2.3.2. Color

FIG. 7 also illustrates the manner in which the scanner software 202 measures the distortions in the color calibration image(s) and calculates the color calibration coefficients 316.

In step 704, the scanner software 202 builds a lookup table having 216 entries. The 216 entries correspond to the 216 different colors in the CCI. Each entry in the lookup table identifies what color will be actually printed for the entry's corresponding color in the original CCI.

For example, suppose a square in the original CCI is light blue. For reference purposes, this square is labeled S1. Also suppose that, due to distortions caused by the transfer functions 306 in the print path, light blue in the CCI is printed as dark blue. During step 704, the scanner software 202 measures the color in the corresponding square S1 in the printed CCI. According to the current example, the scanner software 202 would find that square S1 in the printed CCI contains dark blue. Thus, the scanner software 202 would insert dark blue in the entry of the lookup table which corresponds to the square S1.

FIGS. 10A and 10B collectively illustrate a lookup table. FIG. 10A illustrates a table having 216 entries wherein the 216 entries contain the 216 different colors in the CCI. Note that R stands for red, G stands for green, and B stands for blue. Thus, each of the 216 colors is identified by a red/green/blue combination. FIG. 10B illustrates a table having 216 entries wherein the 216 entries contain the colors that will actually be printed for the corresponding entries in the table of FIG. 10A.

Note that the values in FIG. 10A are stimulus and the values in FIG. 10B are responses. For example, in order to have a color 2, 4, 1 (that is, entry 0 in FIG. 10B) in the final document 314, it is necessary to have a color 0, 0, 0 (that is, entry 0 in FIG. 10A) in the scanned image of the original document 302.

In step 708, the scanner software 202 inverts the 216 values in the lookup table. The 216 inverted values are placed in a color compensation table. The color compensation table represents the color calibration coefficients 316 for the print path. The inverted values in the color compensation table represent the precompensated colors which are written into a digital image of an original document 302 for each color present in the original document 302. The inverted values in the color compensation table offset the distortions caused by the transfer functions 306 in the print path being calibrated.

Figure 10D:
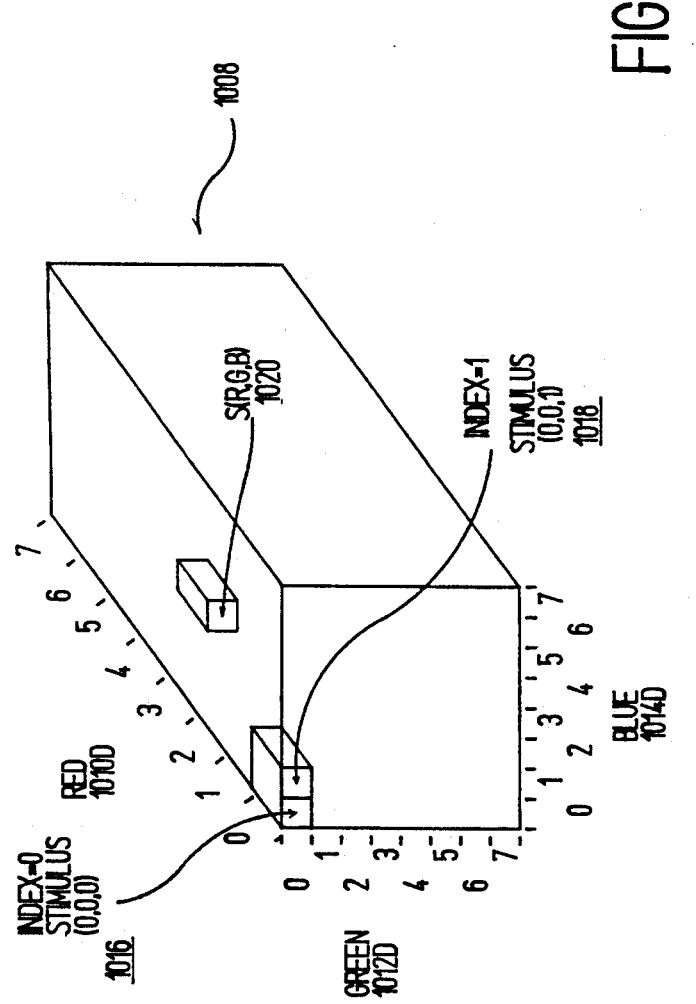
FIG. 10D illustrates a color compensation table according to the present invention.

Note that the CCI contains only 216 colors. FIG. 10D illustrates a color compensation table 1008 according to the present invention. The color compensation table 1008 has 512 colors to improve accuracy. (Note that the tables described in this patent document may be stored in the RAM 214.)

The color compensation table 1008 has red indices 1016D, green indices 1012D, and blue indices 1014D. These indices represent desired responses. The contents of the color compensation table 1008 represent stimuli which are necessary to achieve the desired responses. For example, in order for a color 0, 0, 0 to appear in the final document 314, it is necessary to place a stimulus 1016 in the scanned image of the original document 302. Similarly, in order for a color 0, 0, 1 to appear in the final document 314, it is necessary to place a stimulus 1018 in the scanned image of the original document 302.

Note that each of the values in the color compensation table 1008 is assigned an index. For example, the index of the stimulus 1016 is 0. The index of the stimulus 1018 is 1. FIG. 10C illustrates the indices of the color compensation table and the corresponding desired responses.

The inversion process for inverting the values in the lookup table uses an iterative technique (the preferred embodiment of the present invention uses 100 iterations.) The inversion process also uses algorithmic compensations to map out-of-gamut colors into the printer gamut, and to compensate for the lower reflectance or lightness range of most computer printers 226 compared to original photography.

Figure 8A:
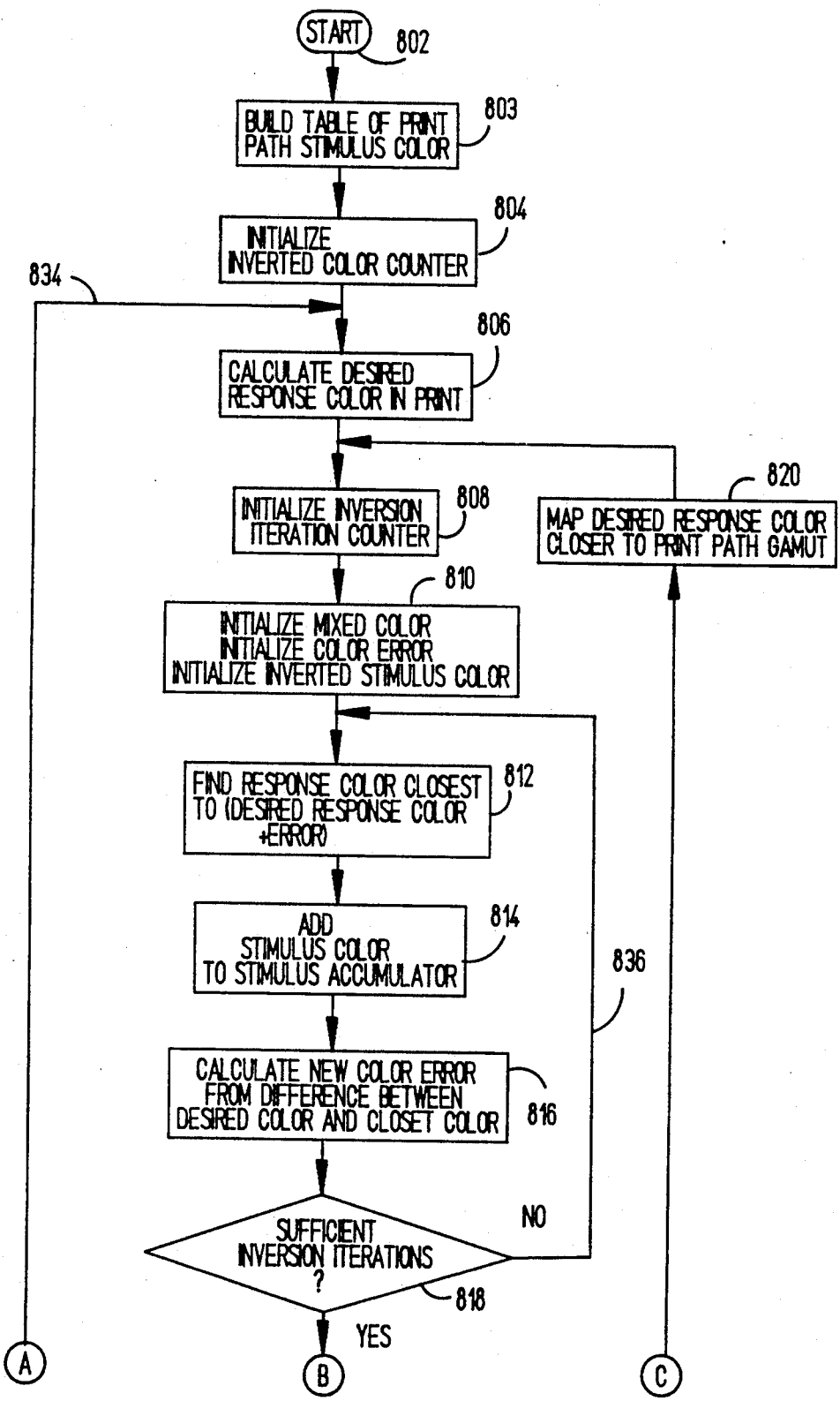
FIGS. 8A and 8B collectively illustrate the creation of color calibration coefficients.
Figure 8B:
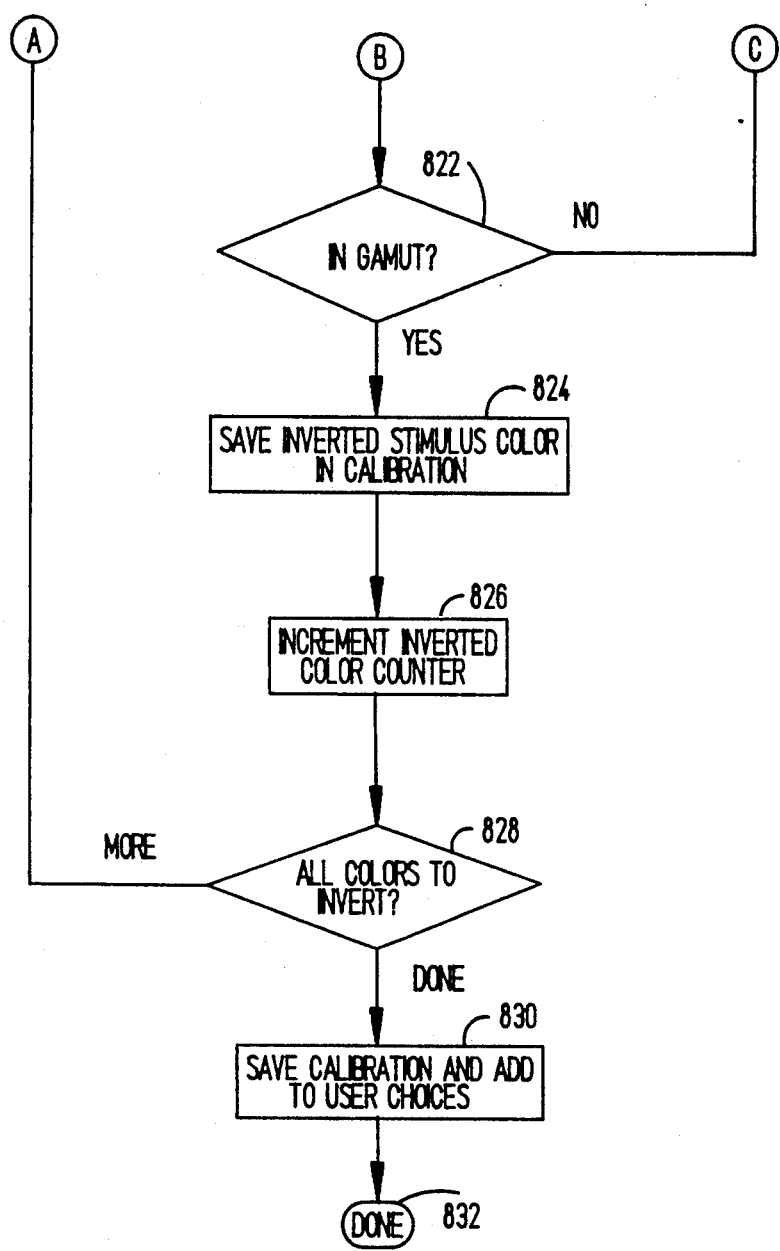

FIGS. 8A and 8B collectively illustrate step 708 in greater detail.

In step 803 the scanner software 202 builds a table of stimulus colors 510.

In step 804 the scanner software initializes an inverted color counter. The inverted color counter is used to ensure that the loop formed by line 834 is performed for each of the 512 entries in the color compensation table. The inverted color counter identifies one of the 512 entries in the color compensation table 1008.

In step 806, the scanner software 202 calculates what the desired response color is for the entry in the color compensation table 1008 identified by the inverted color counter.

In step 808, the scanner software 202 initializes an inversion iteration counter. The inversion counter is used to ensure that the loop formed by line 836 is performed 100 times for each of the 512 entries in the color compensation table 1008.

Figure 15:
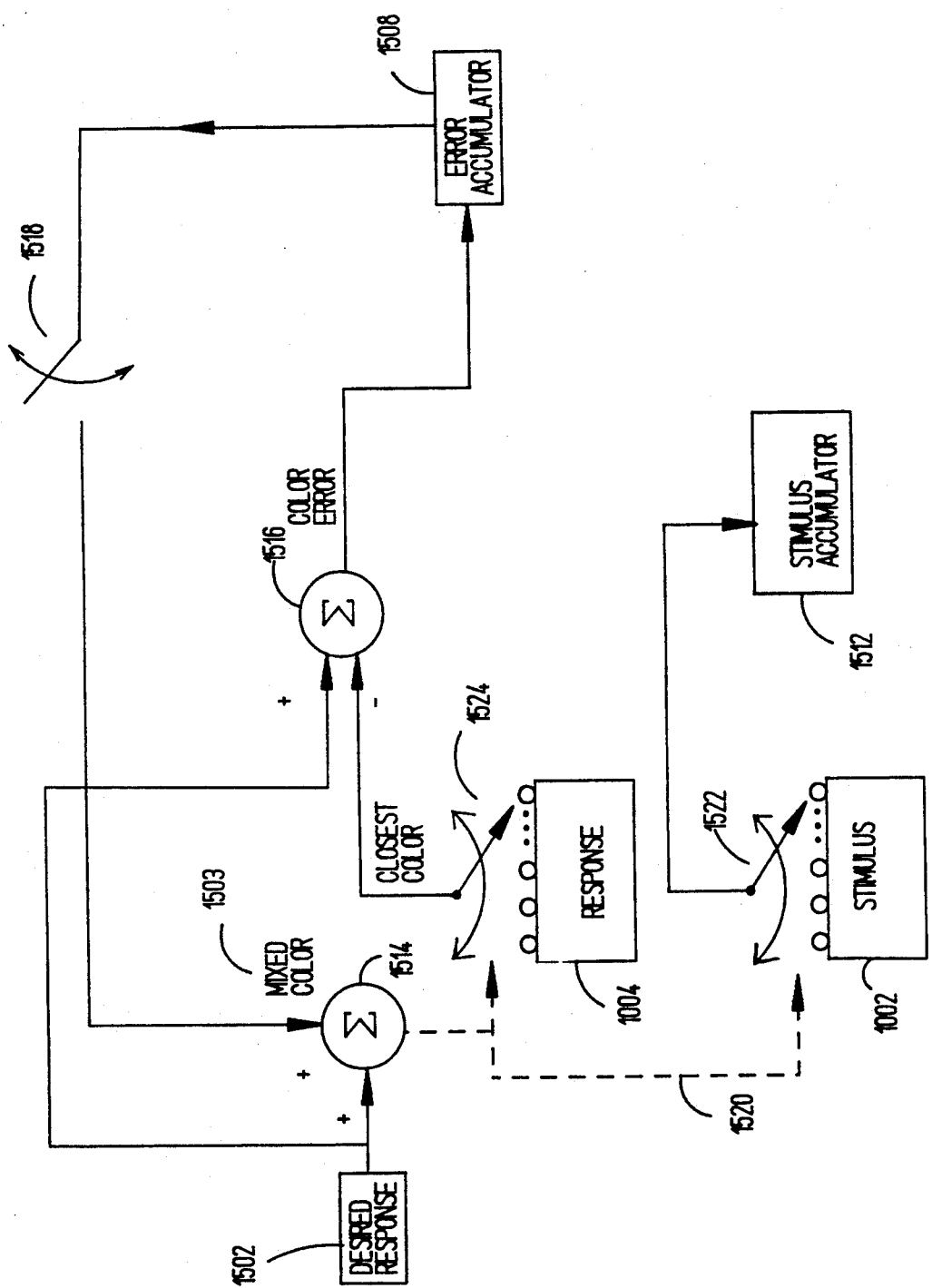
FIG. 15 illustrates a block diagram relating to steps 810, 812, 814, and 816 from FIG. 8.

FIG. 15 illustrates a block diagram relating to steps 810, 812, 814, and 816.

In step 810, the scanner software 202 initializes a color error accumulator and a stimulus accumulator. These accumulators 1508 and 1512 may be implemented in software or hardware.

In step 812, the scanner software 202 adds the color in the error accumulator 1508 to the desired response color 1502 (determined in step 806) to generate a mixed color 1503. It then searches the response lookup table 1004 (see FIG. 10A) to find the color that was scanned from the printed CCI that is closest to the mixed color 1503.

In step 814, the scanner software 202 identifies a stimulus color from the stimulus lookup table 1002 for the closest color (that is, the stimulus color is the color of the same index from the stimulus lookup table 1002 which created the closest color from the response lookup table 1004). The scanner software 202 adds the value of the stimulus coor into the stimulus accumulator 1512.

In step 816 the scanner software 202 determines an error between the desired color (determined in step 806) and the closest color. The scanner software 202 adds the error into the error accumulator 1508.

As indicated by step 818, the scanner software 202 repeats steps 812, 814 and 816 a number of times (100 in the preferred embodiment). As the iteration progresses, the stimulus accumulator converges upon a color that, when divided by the number of iterations, can be inserted in a scanned image of an original document 302, to produce the desired response color in the final document 314.

When the iteration is complete, the scanner software in step 822 determines whether the desired response color 1502 is in the printer gamut. It does this by examining the error accumulator 1508. If error of any color component is large then the desired response color 1502 is out of gamut.

If the color is in gamut, then in step 824 the scanner software 202 divides the contents of the stimulus accumulator by the number of iterations (in this embodiment, 100) and saves the result of the division in the color compensation table 1008 in the entry identified by the current value of the inverted color counter.

In steps 826 and 828 the scanner software 202 increments the inverted color counter and starts processing the next entry in the color compensation table 1008 at step 806.

After the scanner software 202 determines in step 828 that all the entries in the lookup table have been processed, the scanner software 202 in step 830 saves the color compensation table for later selection by the operator.

If (after the iteration is complete) the scanner software 202 determines in step 822 that the error in the error accumulator 1508 is large, then the scanner software 202 concludes that the desired color is outside the printer gamut. The scanner software 202 then performs step 820 to pull the color into the printer gamut. There are many available well-known algorithms for pulling colors into the printer gamut and any may be used in the present invention. In the preferred embodiment of the present invention, the scanner software 202 uses an algorithm which maps to the closest in-gamut color using a least-square-error criterion on the individual red, green and blue components, and maps bright out of gamut colors to darker ones preserving hue and saturation.

2.3.3. Dot Gain Compensation

As described above, the scanner software 202 performs dot gain compensation if a continuous tone image has been converted to a half tone image. Dot gain compensation is described in this section.

Scanner halftones are ordered-dither or error-diffusion conversions of a multi-level color or grayscale image into a binary (or limited, usually 8 color) image. The CCI and GCI each contain a dotgain block 510 having patterns (such as checkerboard patterns). The scanner software 202 uses the dotgain block 510 during calibration to measure the amount of "dot gain" in the print path.

The scanner software 202 modifies its scanner halftones based on these measurements such that its scanner halftones match the characteristics of the print path. For example, if the patterns in the dotgain block 510 printed dark (i.e., display a lot of dotgain) then a lot of dotgain compensation is used. As the patterns in the dotgain block 510 printed lighter, the dotgain compensation is reduced.

Dotgain compensation differs for ordered-dither and error-diffusion conversions. These are described below.

Ordered dithers are modified by measuring the printer dot gain and calculating a custom ordered-dither pattern. This is done by starting with two master dither patterns- one linear, and one with dotgain compensation for the primary host printer 226.

For error-diffusion, a custom dotgain compensation table is calculated and applied to the image prior to diffusion. This table is calculated from two master tables- one linear and one designed for the primary host printer 226.

Ordered dithers are modified by measuring the printer dot gain and calculating a custom ordered-dither pattern. This is done in the preferred embodiment by starting with two master dither patterns—one linear, and one with full dotgain compensation designed for the primary printer (in the preferred embodiment, a Hewlett-Packard LaserJet III.)

If the measurements of the dotgain block 510 match or are darker than the reflectance of dotgain blocks when printed by the primary printer, then the dotgain compensated ordered dither matrix is used.

If the measurements of the dotgain block 510 are lighter than those made with the target printer, a custom ordered dither matrix is calculated. For each entry in the matrix, perform a weighted average between the entry in the linear matrix and the full dotgain compensated matrix according to the lightness of the measurement. If the measurement reaches a 50% screen (i.e., a reflectance equal to the average between ink and paper) then use 100% of the linear matrix.

For error-diffusion, a custom dotgain compensation table is calculated and applied to the image prior to diffusion. This table is calculated from two master tables—one linear and one designed for the primary host printer.

An error-diffusion dotgain compensation table consists of a lookup table of 256 entries. This table is applied to each pixel in the image prior to the error-diffusion step.

If the measurements of the dotgain block 510 match or are darker than the reflectance of dotgain blocks when printed by the primary printer, then the dotgain compensated table is used.

If the measurements of the dotgain block 510 are lighter than the reflectance of the dotgain block when printed by the primary printer, a custom error-diffusion dotgain compensation table is calculated. Each entry in the table is calculated from a weighted average between the dotgain compensation master table and the linear table according to the lightness of the measurement. If the measurement reaches a 50% screen (i.e., a reflectance equal to the average between ink and paper) then use 100% of the linear matrix.

2.4. Precompensate Image

As described below, in step 416 the scanner software 202 uses the calibration coefficients 316 associated with the calibration of the print path in order to precompensate the digital image (that is, the scanned image) associated with the original document 302. The manner in which the scanner software 202 performs step 416 is different for black and white and for color. The procedures for black and white and for color are described below.

2.4.1. Black and White

Figure 13:
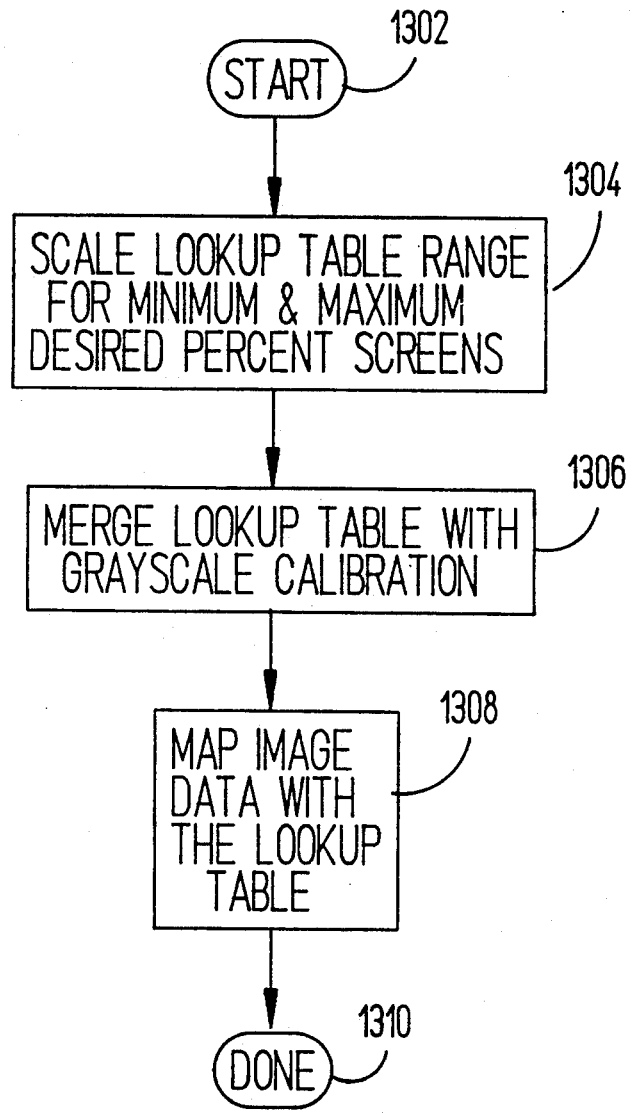
FIG. 13 illustrates the operation of the scanner software 202 with regard to black and white.

FIG. 13 illustrates the operation of the scanner software 202 with regard to black and white.

In step 1304, the operator enters minimum and maximum desired percent screens. With this information, the scanner software 202 performs a linear mapping to put the highlight shadow of the scanned image into the desired screen that the customer has chosen. In other words, during step 1304, the scanner software 202 causes the brightest scanned image to map directly into the brightest printable screen on the printer 226, and the darkest scanned image to map directly into the darkest printable screen on the printer 226. Thus, step 1304 maps the dynamic range of the input to the dynamic range of the output.

In step 1306, the scanner software 202 maps the data in the grayscale compensation table into the dynamic range that was created in step 1304.

In step 1308, the scanner software 202 replaces data in the scanned image with appropriate data in the grayscale compensation table. Following the completion of step 1308, the scanned image is precompensated.

2.4.2. Color

Figure 9:
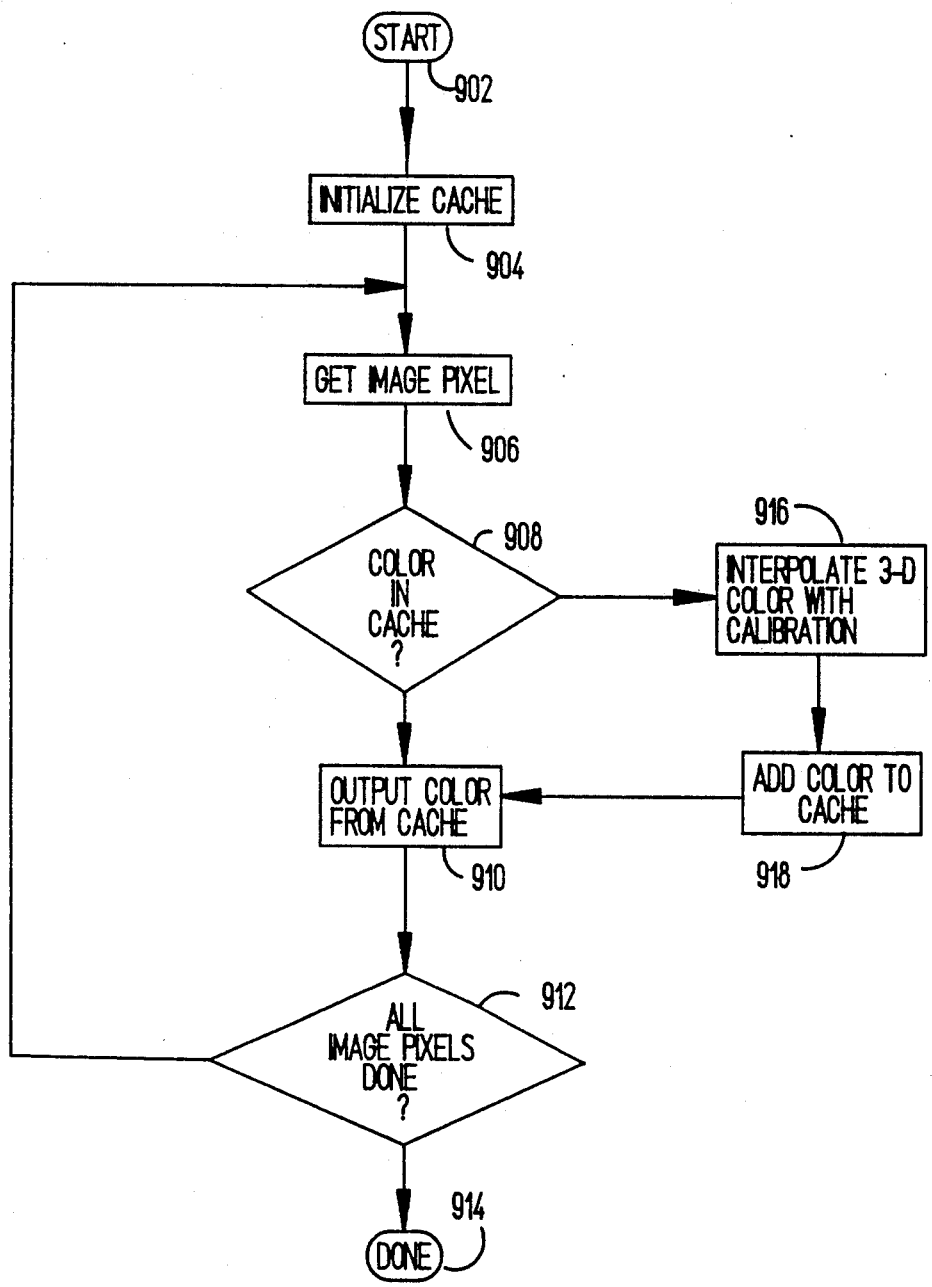
FIG. 9 illustrates the operation of the scanner software 202 with regard to color images.

FIG. 9 illustrates the operation of the scanner software 202 with regard to black and white.

In step 904, the scanner software 202 initializes a cache in the computer platform 204. The operation of the cache is described below.

Figure 11A:
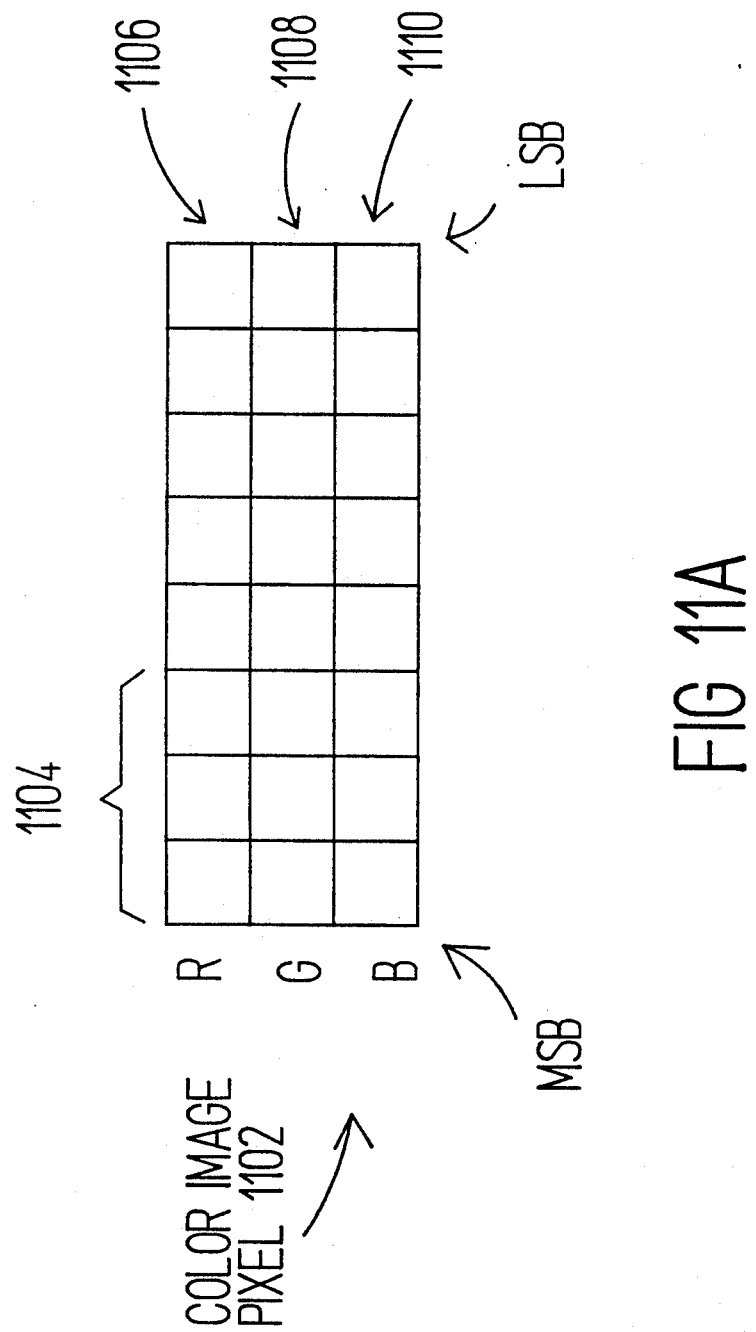
FIG. 11A illustrates the structure of a pixel for color.

In step 906, the scanner software 202 reads a pixel 1102 from the scanned image. FIG. 11A illustrates the structure of the pixel 1102. In the preferred embodiment of the present invention, the pixel 1102 has a color which is identified by 24 bits. For reference purposes, the pixel's 1102 color is called the desired color. The 24 bits has 8 bits of red 1106, 8 bits of green 1108, and 8 bits of blue 1110.

In step 908, the scanner software 202 determines whether a stimulus color for the pixel's 1102 color is in the cache.

If, in step 908, a stimulus color is not in the cache, then the scanner software 202 performs step 916.

In step 916, the scanner software 202 uses the 24 bits 1102 to access the color compensation table 1008. Many techniques may be used to determine an index to the color compensation table 1008 from the 24 bits 1102. For example, the most significant bits 1104 may be used. Or, the 24 bits 1102 may be divided by a value. In the preferred embodiment, the scanner software 202 divides by 36.43 to get the index. For illustrative purposes, suppose the index identifies the stimulus 1020 (in FIG. 10D).

Stimulus 1020 represents a gross color which, when placed in the scanned image, will generally produce the pixel's 1102 desired color. Thus, the present invention uses an interpolation method in order to increase color resolution.

This interpolation method is described below with reference to FIG. 11B. FIG. 11B shows the stimulus 1020. FIG. 11B also shows a stimulus 1112, which is offset from the stimulus 1020 by a single blue index.

FIG. 11B shows a stimulus 1114, which is offset from the stimulus 1020 by a single green index. FIG. 11B shows a stimulus 1116, which is offset from the stimulus 1020 by a red index and a green index.

Consider the blue index. According to the present invention, the scanner software 202 uses the 8 blue bits 1110 of the pixel 1102 to perform a well-known interpolation process between the stimuli 1020 and 1112. The interpolation process yields a stimulus blue value. The scanner software 202 performs the same interpolation process on the red index and green index using the 8 red bits 1106 and 8 green bits 1108, respectively, to produce a stimulus red value and a stimulus green value. The combination of the stimulus blue, red, and green values forms a stimulus color for the desired color.

In step 918, the scanner software 202 stores the stimulus color (calculated in step 916) into the cache. By storing the stimulus color in the cache, the processing time for the process shown in FIG. 9 is greatly reduced since colors are often reused. Step 910, described below, is then performed.

If, in step 908, a stimulus color is in the cache, then the scanner software 202 performs step 910.

In step 910, the scanner software 202 modifies the scanned image. Specifically, the scanner software 202 modifies the pixel 1102 such that the pixel 1102 has the stimulus color from the cache that was determined in step 908.

As indicated by step 912, the scanner software 202 performs the above steps for all the pixels in the scanned image. After all the pixels have been processed, the scanned image is precompensated.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for automatically calibrating a print path in a document processing system, the system receiving image data of an original document generated by an image capture device, such that the system generates a printed document having a true representation of the original document, the method comprising the steps of:
   (a) creating a calibration image for the print path;
   (b) processing said calibration image in the document processing system;
   (c) measuring distortions in said calibration image caused by said processing;
   (d) calculating calibration coefficients for offsetting said measured distortions; and
   (e) precompensating an image of the original document by modifying the image according to said calculated calibration coefficients.

2. The method of claim 1, wherein said input capture device comprises a scanner having a scanner bed, said method further comprising the steps of:
   determining a location of a printed calibration image on the scanner bed.
   recording information regarding a print path calibration associated with said printed calibration image;
   compensating for dotgain in said printed calibration image;
   reducing noise in said printed calibration image; and
   identifying boundaries in said calibration image.

3. The method of claim 2, wherein said calibration image further comprises a color block having a multitude of colors.

4. The method of claim 3, wherein the step of measuring distortions in said calibration image caused by said processing comprises the step of creating a lookup table having entries for said colors in said color block, wherein said entries are associated with original colors and response colors, and wherein said original colors represent said colors in said color block.

5. The method of claim 4, wherein the step of calculating calibration coefficients for offsetting said distortions comprises the steps of:
   (1) creating a compensation table having entries associated with desired colors;
   (2) selecting one of said entries;
   (3) using said original and response colors for determining a stimulus color for said desired color associated with said selected entry;
   (4) saving said stimulus color in said selected entry; and
   (5) repeating steps (1)-(4) for each of said entries.

6. The method of claim 5, wherein said desired colors outnumber said stimulus colors.

7. The method of claim 5, wherein said step for using said original and response colors for determining a stimulus color for said desired color associated with said selected entry comprises the steps of:
   (i) clearing a stimulus accumulator;
   (ii) initializing an error;
   (iii) generating a mixed color by adding said error to said desired color;
   (iv) determining a closest color to said mixed color among said response colors;
   (v) identifying one of said original colors associated with said closest color;
   (vi) adding said identified original color with values in said stimulus accumulator;
   (vii) updating said error by determining a difference between said desired color and closest color;
   (viii) updating said mixed color by adding said error to said desired color;
   (ix) updating said closest color by determining which of said response colors is closest to said mixed color; and
   (x) repeating steps (v)-(ix) for a finite number of iterations such that said stimulus accumulator converges upon said stimulus color.

8. The method of claim 7, wherein steps (v)-(ix) are performed 100 times.

9. The method of claim 5, wherein the step of precompensating the image of the original document by modifying the image according to said calibration coefficients comprises the steps of:
   (i) receiving a pixel color associated with a pixel, wherein said pixel color has a multitude of color bits;
   (ii) retrieving one of said stimulus colors in said compensation table from a position identified by said color bits;
   (iii) retrieving adjacent stimulus colors from said compensation table;
   (iv) generating a high resolution stimulus color by using all of said color bits to interpolate between said retrieved stimulus color and said adjacent stimulus color;
   (v) replacing said pixel color with said high resolution stimulus color; and (vi) repeating steps (i)-(v) for all pixels in the image.

10. The method of claim 2, wherein said calibration image further comprises a grayscale block having a multitude of grays.

11. The method of claim 10, wherein the step of measuring distortions in said calibration image caused by said processing comprises the step of creating a lookup table having entries for said grays, wherein each of said entries is associated with a desired or stimulus gray and a response gray.

12. The method of claim 11, wherein the step of calculating calibration coefficients for offsetting said distortions comprises the steps of:
   (1) selecting one of said entries;
   (2) for said desired gray associated with said selected entry, identifying a closest gray among said response grays in any of said entries;
   (3) saving said stimulus gray associated with said closest gray in a compensation table at a position indexed by said desired gray associated with said selected entry; and
   (4) repeating steps (1)-(3) for each of said entries.

13. The method of claim 12, wherein the step of precompensating the image of the original document by modifying the image according to said calibration coefficients comprises the steps of:
   (1) selecting a gray in the image;
   (2) retrieving one of said stimulus grays in said compensation table from a position indexed by said selected gray;
   (3) replacing said selected gray with said retrieved stimulus gray in said image; and
   (4) repeating steps (1)-(3) for all grays in the image.

14. The method of claim 2, further comprising the step of capturing an image of said processed calibration image comprising the steps of:
   scanning raster scan lines in said scanner bed until said scanner locates a series of black pixels associated with said registration means;
   scanning said raster scan lines until said scanner locates a series of white pixels at a first edge of said registration means;
   determining a skewed direction based on whether said first edge is a left or a right edge of said registration means;
   scanning said raster scan lines until said scanner locates a series of white pixels at a second edge of said registration means;
   determining a distance between where said first and second edges turned white;
   calculating a skewed angle based on said distance; and
   using said tracking means to scan said image for data.

15. The method of claim 1, wherein said step for precompensating comprises dotgain compensation.

16. A document processing system comprising:
   (1) a print path comprising:
      (a) image capture means for capturing an image of an original document;
      (b) means for controlling said image capture means;
      (c) one or more application programs;
      (d) printing means for generating a printed document having said image;
      (e) means for controlling said printing means;
   (2) means for automatically calibrating the print path such that said printed document has a true representation of said image, said means for automatically calibrating comprising:
      (a) means for generating calibration coefficients for offsetting distortions caused by said print path; and
      (b) means for precompensating said image of said original document by modifying said image according to said calibration coefficients.

17. The document processing system of claim 16, wherein said means for generating calibration coefficients for offsetting distortions caused by said print path comprises:
   means for creating a calibration image for said print path;
   means for processing said calibration image in said print path;
   means for measuring distortions in said calibration image caused by said processing; and
   means for calculating calibration coefficients for offsetting said distortions.

* * * * *